US012567388B2

(12) United States Patent
Doebler

(10) Patent No.: US 12,567,388 B2
(45) Date of Patent: Mar. 3, 2026

(54) METHOD FOR CONTROLLING ACTIVE MATRIX DISPLAYS, CORRESPONDING CONTROLLER, AND COMPUTER PROGRAM PRODUCT

(71) Applicant: PENNY PIXEL, INC., Dover, DE (US)

(72) Inventor: Achim Doebler, Vilsheim (DE)

(73) Assignee: PENNY PIXEL, INC., Dover, DE (US)

( * ) Notice: Subject to any disclaimer, the term of this patent is extended or adjusted under 35 U.S.C. 154(b) by 0 days.

(21) Appl. No.: 18/726,925

(22) PCT Filed: Jul. 28, 2023

(86) PCT No.: PCT/EP2023/071053
§ 371 (c)(1),
(2) Date: Jul. 5, 2024

(87) PCT Pub. No.: WO2024/023325
PCT Pub. Date: Feb. 1, 2024

(65) Prior Publication Data

US 2025/0157430 A1 May 15, 2025

(30) Foreign Application Priority Data

Jul. 29, 2022 (DE) ..................... 10 2022 119 130.3

(51) Int. Cl.
*G09G 3/36* (2006.01)
*G09G 3/20* (2006.01)
*G09G 5/36* (2006.01)

(52) U.S. Cl.
CPC ......... *G09G 3/3648* (2013.01); *G09G 3/2003* (2013.01); *G09G 5/36* (2013.01)

(58) Field of Classification Search
CPC ... G06F 13/4291; G06F 13/28; G06F 13/4282
See application file for complete search history.

(56) References Cited

U.S. PATENT DOCUMENTS 11,979,695 B2 * 5/2024 Fang .................. H04N 23/6812
2007/0188313 A1 8/2007 Huang
(Continued)

FOREIGN PATENT DOCUMENTS

CN 102074205 A 5/2011
EP 1560190 A2 8/2005
(Continued)

OTHER PUBLICATIONS

German Patent Office; Search report in related German Patent Application No. 10 2022 119 130.3 dated May 2, 2023; 10 pages.
(Continued)

*Primary Examiner* — Van N Chow
(74) *Attorney, Agent, or Firm* — Dorton & Willis, LLP

(57) ABSTRACT

A method for controlling active matrix displays in an inexpensive manner, in particular with a highly flexible color diversity, includes running a program stored in a program storage device of a microcontroller. The program actuates a DMA controller to read image data of the color depth of 1 bit per pixel from a data storage device, and transmits via the DMA controller an RGB image data set generated by the program therefrom to a hardware SPI connected to the DMA controller. The hardware SPI transmits the RGB image data set to the active matrix display in a serial manner via the data output thereof, wherein in order to synchronize the data transmission to the active matrix display, the SPI clock output controls the pixel clock input of the active matrix display.

14 Claims, 10 Drawing Sheets

(56) References Cited

U.S. PATENT DOCUMENTS

| | | | | |
|---|---|---|---|---|
| 2017/0083762 | A1* | 3/2017 | Segalovitz | G06V 30/142 |
| 2023/0385226 | A1* | 11/2023 | Wu | G06F 13/28 |

FOREIGN PATENT DOCUMENTS

| | | | |
|---|---|---|---|
| EP | 1691272 | A2 | 8/2006 |
| WO | 2017032911 | A1 | 3/2017 |
| WO | 2022073363 | A1 | 4/2022 |

OTHER PUBLICATIONS

European Patent Office; Search Report in related International Patent Application No. PCT/EP2023/071053 dated Jul. 28, 2023; 18 pages.

Anonymous. "2" TFT LCD Module with resistive Touch Panel Mar. 18, 2017 (Mar. 18, 2017), pp. 1-17, Retrieved from the Internet: https://www.mikrocontroller.net/attachment/337267/KD020QVTMA008-RT.pdf [retrieved on Oct. 19, 2023] XP093093042 p. 3-p. 4.

Brazilian Patent Office; Office Action in related Brazilian Patent Application No. BR112025001130-8 dated Aug. 18, 2025; 6 pages.

* cited by examiner

METHOD FOR CONTROLLING ACTIVE MATRIX DISPLAYS, CORRESPONDING CONTROLLER, AND COMPUTER PROGRAM PRODUCT

CROSS-REFERENCE TO RELATED APPLICATIONS

This application is a national phase application under 35 U.S.C. § 371 of International Patent Application No. PCT/EP2023/071053, filed Jul. 28, 2023 (pending), which claims the benefit of priority to German Patent Application No. DE 10 2022 119 130.3, filed Jul. 29, 2022, the disclosures of which are incorporated by reference herein in their entirety.

TECHNICAL FIELD

The invention relates to a method for controlling active matrix displays, as well as to a controller with a program storage device in which a program is stored that is designed and configured to carry out the method, and to a computer program product having a machine-readable carrier on which the program code of a program is stored for carrying out the method on the controller.

BACKGROUND

EP 1 560 190 A2 describes a host computer that provides image data for each image of a sequence via a serial bus. The image data are extracted from the data received via the serial bus to an electronic subassembly connected between the host computer and a display device. The extracted image data are stored in the image memory of the electronic subassembly in order to be displayed under the control of the electronic subassembly. Also described is an apparatus for operating a display device by generating a continuously updated display using sequentially received frames of image data that define one or more pixels.

EP 1 691 272 A2 describes a method and system for processing video data to be displayed on a first video display connected to a single mobile multi-media processor that supports a variety of display formats. The single, mobile, multiple media processor can be integrated into a mobile device. The video data transferred by a DMA controller from the memory to the first video display can be limited based upon the particular first video format associated with the video data to be displayed on a first video display. Only the limited amount of video data to be displayed by the first video display can be transferred from the memory to the first video display by the DMA controller.

SUMMARY

The object of the invention is to provide a method for controlling active matrix displays with which active matrix displays can be controlled in a cost-effective manner, in particular with a very flexible diversity of colors.

The object is achieved by a method for controlling active matrix displays, comprising the steps of:

- loading a data storage device with image data in a color depth of 1 bit per pixel of an image to be displayed on an active matrix display,
- executing a program which is stored in a program storage device of a microcontroller and which controls a DMA controller in such a way that the DMA controller reads out the image data of the color depth of 1 bit per pixel from the data storage device, wherein the read-out image data of the color depth of 1 bit per pixel are extended by the program by additional blanking data which correspond to the specification of a parallel RGB interface, so that an RGB image data set which can be read in by the active matrix display is generated, and
- transmitting the RGB image data set generated by the program by means of the DMA controller to a hardware SPI connected to the DMA controller, which SPI transmits the RGB image data set serially to the active matrix display via its data output, wherein the SPI clock output controls the pixel clock input of the active matrix display to synchronize the data transmission to the active matrix display.

Active matrix displays (AMD) are in particular liquid crystal display devices with an active control of a plurality of point-shaped image display elements (pixels) arranged in rows and columns. The plurality of point-shaped image display elements arranged in rows and columns form a matrix of image display elements which can be controlled, for example, via thin-film transistors on the matrix. An active matrix display can, for example, be an active matrix liquid crystal display, which is also known as AMLCD (active matrix liquid crystal display) as an acronym. Alternatively, the active matrix display can also be based upon another display technology, such as organic LED's (OLED or AMOLED).

Active matrix displays (AMD), in general terms, can be designed either with an internal image memory or without an internal image memory. The image memory is also commonly referred to as a frame buffer. The method according to the invention is particularly advantageously suitable for controlling active matrix displays which do not have an internal image memory.

An image memory generally has a largely arbitrary data storage device, which must, however, be suitable for storing image data. Preferably, the data storage device is at least one electronic memory module with random, i.e., direct, access. This type of memory is also called RAM. For example, it can be a static RAM (SRAM) or a dynamic RAM (DRAM).

Since large data memories or image memories above a certain resolution are relatively expensive, active matrix displays are preferably manufactured and offered without internal image memory, so that the price of the active matrix display can be kept as low as possible. For the customer of such active matrix displays without image memory, however, it is necessary to provide a required data storage device or image memory in order to be able at all to display images with the desired color depth on the active matrix display used.

The method according to the invention for controlling active matrix displays has the object of finding a technical solution such that images of a reduced color depth, in particular a color depth greater than 1 bit per pixel, can be displayed on the controlled active matrix display without the need for a data storage device or an image memory which has to have a memory size corresponding to the desired color depth or the color depth to be displayed. With the method according to the invention, in particular only one data storage device or one image memory is required, which has a color depth of 1 bit per pixel. Thus, in the simplest case, only the information about whether a certain punctiform image display element, i.e., a certain pixel, is to appear bright or remain dark is stored in the data storage device or image memory. According to the invention, the color information that may be desired per pixel, per row, and/or per column of the matrix of the active matrix display does not have to be stored in the data storage device or in the image memory, but, rather, via the program stored in the program storage device, can be made available separately per pixel, per row, and/or per column of the matrix of the active matrix display, as the case may be. Since, in many applications, the full color depth which the correspondingly selected active matrix display could display due to its design is not required, a significantly smaller data storage device or image memory can be used when using the method according to the invention. This enables the control of active matrix displays in a very cost-effective manner.

Active matrix displays (e.g., AM-LCD's or AM-OLED's) offer, depending upon their size and design, high resolutions, e.g., up to 4,096×2,180 points (pixels) or even more, and typically have color depths of 24 bits per pixel. These active matrix displays can display approximately 16.8 million different colors per pixel. The high resolution and color depth of such active matrix displays results in a considerably higher memory requirement for the image content compared to passive matrix displays. For display sizes of approximately 3.5 inches or larger, or a resolution of approximately 320×240 pixels or more, this large image content can no longer be stored in the "chip-on-glass" (COG) memory or the "chip-on-board" (COB) memory, such that these displays do not have an internal image memory. However, since the display matrix, just like passive matrix displays, must be constantly updated to maintain a flicker-free image, the image data required for this must be continuously provided by a microcontroller or a processor of an application. This takes the data either from its internal memory (e.g., SRAM) or, in many cases, from an external SD or DDR RAM, as this is the only way to provide sufficient memory.

Due to the required refresh frequency of the display (e.g., ≥50 Hz) and the simultaneous high image memory requirement, data rates in the range of 100 Mbit/s to more than 10 Gbit/s quickly become required for the control of active matrix displays. These data rates must be transmitted continuously, even with a static image, both between the microcontroller or processor and the display and between the microcontroller or processor and the external image data storage device. Such high bandwidths can be transmitted to the display only via special interfaces, e.g., parallel RGB (DPI) or LVDS. In addition, the microcontroller must contain powerful peripheral components in order to be able to process and provide the data rates, which generally results in significantly higher costs for controlling active matrix displays compared to passive matrix displays.

Active matrix displays often have enormous color depths, which is why signal sources such as microcontrollers and processors that are intended to control such a display must have suitable interfaces, e.g., a parallel RGB interface, complex peripheral modules, e.g., hardware acceleration, DRAM controllers, and a large number of inputs and outputs (I/O's). These peripheral modules require additional chip area. The high number of inputs and outputs also makes the chip housing larger, so that the microcontroller not only becomes more expensive, but the layout also becomes significantly more complex. For controlling active matrix displays without image memory, and depending upon the resolution, microcontrollers can therefore be divided into two categories, viz., suitable or unsuitable. Many microcontrollers that have the necessary peripheral modules and display interfaces do offer the option of subsequently reducing the color depth, e.g., to 8 bits per pixel or 256 colors per pixel, thus saving upon pins and memory, but the user must still use the fully equipped microcontroller with special peripheral modules and the specified display interface. In the context of the invention, microcontrollers are predominantly discussed below. Instead of microcontrollers, however, for example processors, or microcontrollers and processors, that are implemented in FPGA's can be used in the same way.

This creates an unsatisfactory situation for all users who do not need color or need only a very limited number of colors, but who would still like to use an active matrix display because of its other advantages, such as high contrast ratio, high resolution, high brightness, a good selection in many standard sizes, and/or a better visual appearance, which is generally much more attractive than is the case with passive matrix displays.

The advantage of the method according to the invention can be to enable the user to make do with inexpensive, simple, relatively primitive microcontrollers or processors, in particular without the aid of external display controllers with image memories (e.g., SSD2119, FT800) or timing generators (e.g., CPLD's, FPGA's), to emulate a parallel RGB interface for active matrix displays and thus control them directly and at low cost.

The microcontroller preferably used to carry out the method comprises the data storage device for the image data and the program storage device on which the program is stored. The program comprises a program code that can be read by the microcontroller and that instructs and/or configures the microcontroller to carry out the method according to the invention when the program code is executed by the microcontroller.

The microcontroller preferably also comprises a DMA controller (DMAC), a hardware SPI peripheral (hereafter referred to as hardware SPI for short) with a serial data output (MOSI) and a clock output (SCK).

After the DMA controller, controlled by the program, has read the image data of the color depth of 1 bit per pixel from the data storage device, the image data is, according to the method, expanded by the program with additional blanking data, which correspond to the specification of a parallel RGB interface of the active matrix display to be controlled. The blanking data supplement the matrix of the image data pixels to be displayed with additional data pixels, which expand the image data pixels to form an enlarged matrix, which, in addition to the inner image data pixels, also includes a vertical front blanking interval (vertical front porch), a vertical back blanking interval (vertical back porch), as well as a vertical synchronization, and a horizontal front blanking interval (horizontal front porch), a horizontal back blanking interval (horizontal back porch), and a horizontal synchronization.

The program automatically extends the image data with these additional blanking data such that an RGB image data set (frame) is generated that can be read by the active matrix display. This automatically generated RGB image data set is then, according to the method of the invention, transferred in a particular way by the program, viz., by means of the DMA controller (DMAC) to a hardware SPI (serial peripheral interface) connected to the DMA controller. The program thus automatically extends the image data with these additional blanking data, in particular in such a way that an RGB image data set (frame) is generated that can be read by the active matrix display and that meets the requirements of a display with a parallel RGB interface. In most cases, displays with a parallel RGB interface will be color displays and accordingly have a parallel RGB interface. However, the method according to the invention can also be used for purely monochrome active matrix displays, in which the data lines for transmitting the color information of the parallel RGB interface are usually designated as D0, D1, D2, . . . $D_n$ instead of R0, R1, R2, . . . $R_n$, G0, G1, G2, . . . $G_n$, B0, B1, B2, . . . $B_n$ for colored displays.

The hardware SPI sends the RGB image data set, automatically assembled by the program, via its data output (MOSI: master out, slave in), serially to the display.

To synchronize the data transmission to the active matrix display, the SPI clock output (SCK) controls the pixel clock input (PCLK) of the active matrix display. To make this possible, the SPI clock output (SCK) of the microcontroller must be connected to the pixel clock input (PCLK) of the active matrix display, as part of a hardware setup that includes the microcontroller required to carry out the method and the desired active matrix display.

The other signals, such as the horizontal synchronization pulses (HSYNC), the vertical synchronization pulses (VSYNC), and the data-enable signal (DE), are also generated by the program, i.e., are provided, so that no special pins are necessary for this; rather, it is possible to use only simple GPIO's of the microcontroller. For this purpose, the program tracks the position in the data stream in the horizontal and vertical direction and controls the signals HS, VS, and DE accordingly. As the transfer pulse for reading the color information into the display, the pixel clock input (PCLK), the method described here directly uses (as already mentioned) the SPI clock line (SCK) of the hardware SPI peripheral of the microcontroller, which line is to be connected to the pixel clock input (PCLK).

The color information is provided directly through the data output of the hardware SPI peripheral (MOSI). In the simplest case, all color inputs of the display are connected to each other and to the MOSI pin of the microcontroller. The display is then operated in purely monochrome fashion, as a black and white display. However, by appropriately connecting the color inputs of the display, the display can also be operated in a monochrome color display instead of a black and white display, e.g., in a black and red display or a black and yellow display, in particular in any color from the color depth palette of the display. In the further description of advantageous embodiment variants of the invention, alternative configurations for connecting and/or controlling the color inputs of the display will be disclosed later, so that any desired colorful color representations are possible instead of a monochrome representation.

In a further development of the method, the program stored in the program storage device can automatically add the additional blanking data required according to a predetermined specification to the image data when it is executed to emulate a parallel RGB interface.

Such an addition can be carried out in particular by inserting the blanking data, portion by portion, into a serial data stream of the image data according to a row-by-row and column-by-column grid.

In order to insert blanking data portion by portion into a serial data stream, it can be provided in particular that the program automatically insert a number of dummy bytes corresponding to the specification of the parallel RGB interface into the data stream of the image data. The dummy bytes can be provided by setting up the program to read a specified byte from a predetermined storage location in a data storage device and to automatically copy this read byte in at the corresponding location in the data stream of the image data in order to generate the required blanking data. Based upon the well-known display specification of the parallel RGB interface, the lengths of the image rows, i.e., the number of pixels per row of the image to be displayed, and the length of the image columns, i.e., the number of pixels per column of the image to be displayed, are known. Therefore, the blanking data or dummy bytes can be inserted portion by portion at the correct locations in the serial data stream of the image data.

When executed, the program stored in the program storage device can automatically synchronously generate the synchronization signals (HSYNC, VSYNC, Data-Enable) required for a synchronized reading of the data stream of the image data into the active matrix display (AMD) and send them to the active matrix display (AMD) via GPIO's of the microcontroller.

The program thus provides the required synchronization signals at the required times, depending upon the specification of the parallel RGB interface. The horizontal synchronization signal can for example be provided at a first GPIO of the microcontroller. The vertical synchronization signal can for example be provided at a second GPIO of the microcontroller. The data-enable signal can for example be provided at a third GPIO of the microcontroller. Each GPIO is a general-purpose input/output pin on a port of a microcontroller, known to those skilled in the art. For example, GPIO's can be used as digital inputs or outputs.

As already mentioned, in a first embodiment of the method, one or more RGB inputs of the active matrix display can be connected to each other and jointly connected to the data output (MOSI) of the hardware SPI peripheral of the microcontroller. In this case, the data output (MOSI) of the hardware SPI peripheral controls the one connected RGB input of the active matrix display alone, or the data output (MOSI) of the hardware SPI peripheral jointly controls the plurality, in each case, of connected RGB inputs of the active matrix display. If, for example, a single pin of an 8-bit color channel, i.e., either the red color channel, the green color channel, or the blue color channel, is connected to the data output (MOSI) of the hardware SPI peripheral, then the image read from the data storage device is displayed on the connected active matrix display in the corresponding color tone, i.e., for example, in a certain red, a certain green, or a certain blue. The connection can therefore be hardwired so that this color setting is not programmable, i.e., it cannot be changed without structural intervention.

Depending upon the type and number of RGB color channel pins connected to the data output (MOSI) of the hardware SPI peripheral, any color can be selected from the color palette specified by the parallel RGB interface of the display.

To set specific color tones, alternatively or additionally, in a second variant embodiment of the method, the data stream provided via the data output (MOSI) can be passed through an inverter (complement gate) before the data stream is fed to one or more RGB inputs of the active matrix display (AMD). Alternatively or additionally, for example, different pins of a corresponding 8-bit color channel can selectively be set fixedly to "0" instead of "1" in order to be able to set a specific color value.

Furthermore, alternatively or additionally, in a third variant embodiment, the data stream provided via the data output (MOSI) can be fed to a corresponding first input of one or more AND gates, and the program, via at least one additional GPIO of the microcontroller, which GPIO is connected to the corresponding second input of the AND gate in each case, can provide control data, for masking the data stream, before the masked data stream is fed to one or more RGB inputs of the active matrix display (AMD), in order to automatically set a desired RGB value by controlling the at least one AND gate using the program stored in the program storage device. For example, one or more pins of each 8-bit color channel can be selectively programmed to either "1" or "0." The pins of the color channels controlled by the data output (MOSI) of the hardware SPI peripheral can thus be switched at any time by the program in order to select, i.e., activate, a different color for the display on the active matrix display. Such program-controlled switching is not only possible for each frame to be displayed, but the color to be displayed can even be switched as desired within a frame, e.g., after one or more rows of a frame, changing within a row, e.g., so that one or more columns are displayed in specific colors, or even pixel by pixel, so that an image colorful to almost any degree can be displayed on the active matrix display.

To implement this specific development, the program stored in the program storage device, when it is executed, can automatically switch the at least one AND gate in time-synchronized fashion with the data stream, in particular on the basis of the signal at the SPI clock output (SCK), in particular in order to change the color to be displayed on the active matrix display (AMD) column by column, row by row, or pixel by pixel.

In another possible embodiment, the RGB image data set can be sent to an interface converter instead of directly to the active matrix display, which converter converts the data stream of the RGB image data set into a modified data stream of another display interface, in particular into a modified data stream of a non-parallel RGB interface, e.g., an LVDS interface, and the converted data stream is fed to the active matrix display, in particular to an active matrix display with an interface other than a parallel RGB interface, as an image data set.

The object is also achieved according to the invention by a controller, having:

- a data storage device for storing image data in a color depth of 1 bit per pixel of an image to be displayed on an active matrix display,
- a microcontroller with a program storage device in which a program is stored which is designed and configured to carry out a method according to one or more of the described embodiments, wherein the microcontroller controls a DMA controller, controlled by the program, and a hardware SPI connected to the DMA controller, in such a way that:
- an RGB image data set generated by the program can, by means of the DMA controller, be transferred to the hardware SPI connected to the DMA controller, so that the hardware SPI can send the RGB image data set serially to the active matrix display via its data output,
- wherein, to synchronize the data transmission to the active matrix display, the SPI clock output of the microcontroller is connected to the pixel clock input of the active matrix display.

Any standard microcontroller can be used as the microcontroller-for example, an Arm Cortex-Mx IP core that has a RISC architecture. Alternatively, an Arm Cortex-Ax IP core can for example also be used, which is already widely used in smartphones, mobile computers, and digital televisions. No special display controller, such as type SSD2119 or FT800, is required. Special timing generators, such as CPLD's or FPGA's, are also not required.

The DMA controller can be part of the microcontroller, in whose program storage device is stored the program designed and configured to execute the method. The hardware SPI connected to the DMA controller can also be part of the microcontroller, in whose program storage device is stored the program designed and configured to execute the method.

The controller, which comprises the microcontroller together with the DMA controller and the associated hardware SPI, can form a display assembly when connected to a selected active matrix display. In the display assembly, in particular the SPI clock output of the hardware SPI peripheral can be connected to the pixel clock input of the active matrix display.

In the display assembly, a first GPIO connection of the microcontroller can be connected to the HSYNC connection of the active matrix display for transmitting the horizontal synchronization signal. A second GPIO connection of the microcontroller can be connected to the VSYNC connection of the active matrix display to transmit the vertical synchronization signal. A third GPIO connection of the microcontroller can be connected to the data-enable connection of the active matrix display to transmit the data-enable signal. Each GPIO is a general-purpose input/output pin on a port of a microcontroller, known to those skilled in the art. For example, GPIO's can be used as digital inputs or outputs.

As already mentioned, in the display group, one or more RGB inputs of the active matrix display (AMD) can be connected to each other and jointly connected to the data output (MOSI) of the hardware SPI peripheral of the microcontroller.

In the display assembly, the data output (MOSI) of the microcontroller can be connected to an inverter (complement gate) if necessary, and the inverter output is then connected to one or more RGB inputs of the active matrix display.

In the display assembly, the data output (MOSI) of the microcontroller can optionally be connected to a corresponding first input of one or more AND gates, so that the program, via at least one additional GPIO of the microcontroller, which GPIO is connected to the corresponding second input of the corresponding AND gate, can provide control data, for masking the data stream, before the masked data stream is fed to one or more RGB inputs of the active matrix display (AMD), in order to automatically set a desired RGB value by controlling the at least one AND gate using the program stored in the program storage device.

In the display assembly, the microcontroller can be connected to an interface converter at the input side instead of directly to the active matrix display, so that a data stream of the RGB image data set is converted into a modified data stream of another display interface, in particular into a modified data stream of a non-parallel RGB interface, before the converted data stream is fed to the active matrix display, in particular an active matrix display with an interface other than a parallel RGB interface, as an image data set. In this respect, in such a modified display assembly, the interface converter is connected at the output side to the actual active matrix display.

The invention also relates to a computer program product having a machine-readable medium on which program code of a program is stored which can be read by a controller as described, and which instructs and/or configures the controller to carry out a method according to one or more of the described embodiments when the program code is executed by the controller.

The machine-readable carrier can, for example, comprise a memory module such as a ROM or an EPROM, can be a USB stick, or can be a CD or a CD-ROM or a DVD. The machine-readable carrier can also be a data storage device on a server that is designed and configured to read the program from the data storage device of the server upon request in order to create a copy of the data, which is then sent to the requesting client to be stored on a data storage device of the client computer.

Specific embodiments of the invention are explained in more detail in the following description with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
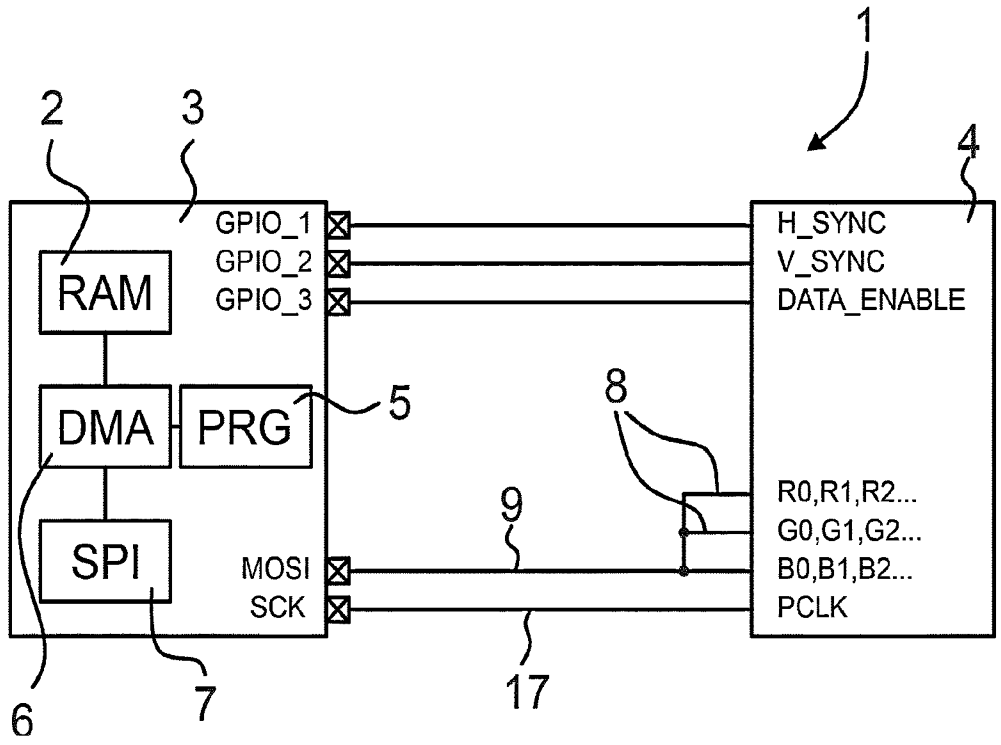
FIG. 1 is a schematic representation of an exemplary first embodiment of a controller or a display assembly for carrying out an exemplary method according to the disclosure with hard-wired RGB inputs of the active matrix display in connection with the SPI data output (MOSI) of the microcontroller, wherein the data storage device is an internal RAM.

The figures of FIG. 1 to FIG. 6 show various exemplary embodiments of controllers 1 according to the disclosure, which can carry out the method according to the invention.

Each controller 1 has a data storage device 2 (RAM) for storing image data in a color depth of 1 bit per pixel. Each controller 1 comprises a microcontroller 3, which is connected to an active matrix display 4 in a manner according to the disclosure.

The microcontroller 3 also comprises a program storage device 5 (PRG) in which a program is stored which is designed and configured to carry out the method according to the invention, wherein the microcontroller 3 controls a DMA controller 6, controlled by the program, and a hardware SPI 7 connected to the DMA controller 6 in such a way that an RGB image data set generated by the program can be transmitted by means of the DMA controller 6 to the hardware SPI 7 connected to the DMA controller 6, so that the RGB image data set can be sent serially to the active matrix display 4 via the SPI data output MOSI of the microcontroller, wherein, for synchronizing the data transmission to the active matrix display 4, the SPI clock output SCK of the microcontroller 3 is connected to the pixel clock input PCLK of the active matrix display 4.

As shown, the DMA controller 6 can be part of the microcontroller 3, in whose program storage device 5 is stored the program designed and configured to carry out the method. The hardware SPI peripheral 7 connected to the DMA controller 6 can also be part of the microcontroller 3, in whose program storage device is stored the program designed and configured to carry out the method.

The controller 1, which comprises the microcontroller 3 together with the DMA controller 6 and the connected hardware SPI 7, can form a display assembly when connected to a selected active matrix display 4. In the display module, in particular the SPI clock output SCK of the hardware SPI 7 can be connected to the pixel clock input PCLK of the active matrix display 4.

In the display assembly, a first GPIO connection GPIO_1 of the microcontroller 3 can be connected to the HSYNC connection of the active matrix display 4 for transmitting the horizontal synchronization signal. A second GPIO connection GPIO_2 of the microcontroller 3 can be connected to the VSYNC connection of the active matrix display 4 to transmit the vertical synchronization signal. A third GPIO connection GPIO_3 of the microcontroller 3 can be connected to the DATA_ENABLE connection of the active matrix display 4 to transmit the data-enable signal. Each GPIO is a general-purpose input/output pin at a port of the microcontroller 3, as known to those skilled in the art. For example, GPIO's can be used as digital inputs or outputs.

Figure 2:
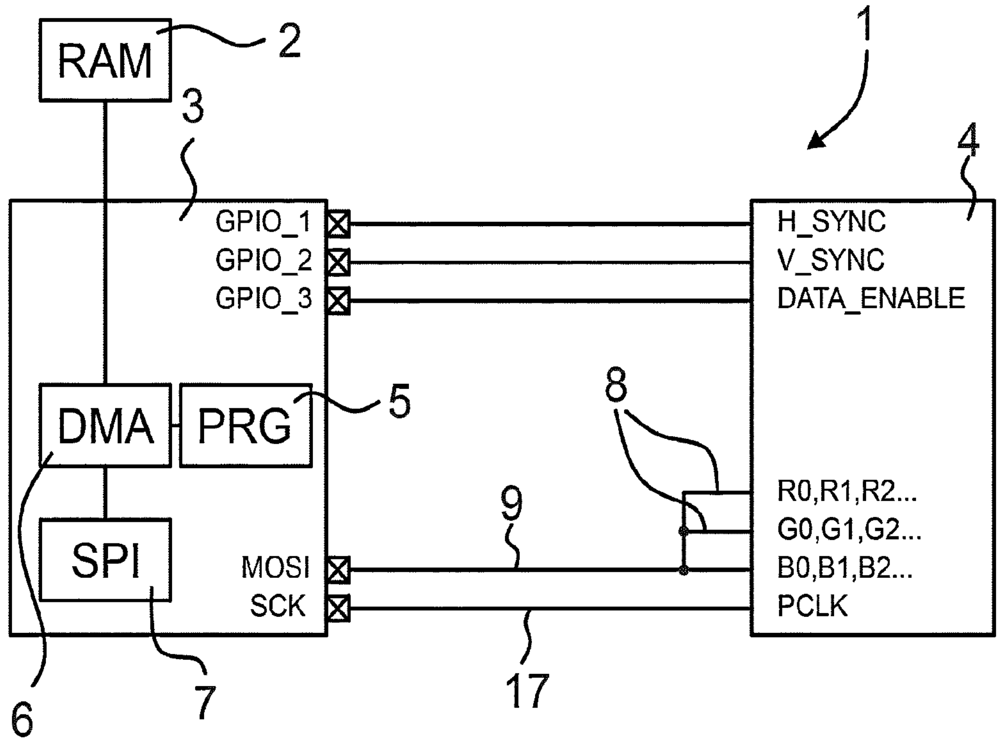
FIG. 2 is a schematic representation of the exemplary first embodiment of a controller or a display assembly for carrying out the exemplary method according to the disclosure with hard-wired RGB inputs of the active matrix display in connection with the SPI data output (MOSI) of the microcontroller, wherein the data storage device is an external RAM.

In the display assembly, one or more RGB inputs of the active matrix display 4 can be connected to one another via connections 8 and jointly connected to a line 9 leading to the data output MOSI of a hardware SPI peripheral 7 of the microcontroller 3, as is specifically shown in FIG. 1 and FIG. 2.

To synchronize the data transmission to the active matrix display 4, the SPI clock output SCK controls the pixel clock input PCLK of the active matrix display 4. To make this possible, the SPI clock output SCK of the microcontroller 3 is connected by a fixed line 17 to the pixel clock input PCLK of the active matrix display 4, as part of a hardware setup that includes the microcontroller 3 required to carry out the method and the desired active matrix display 4.

Figure 3:
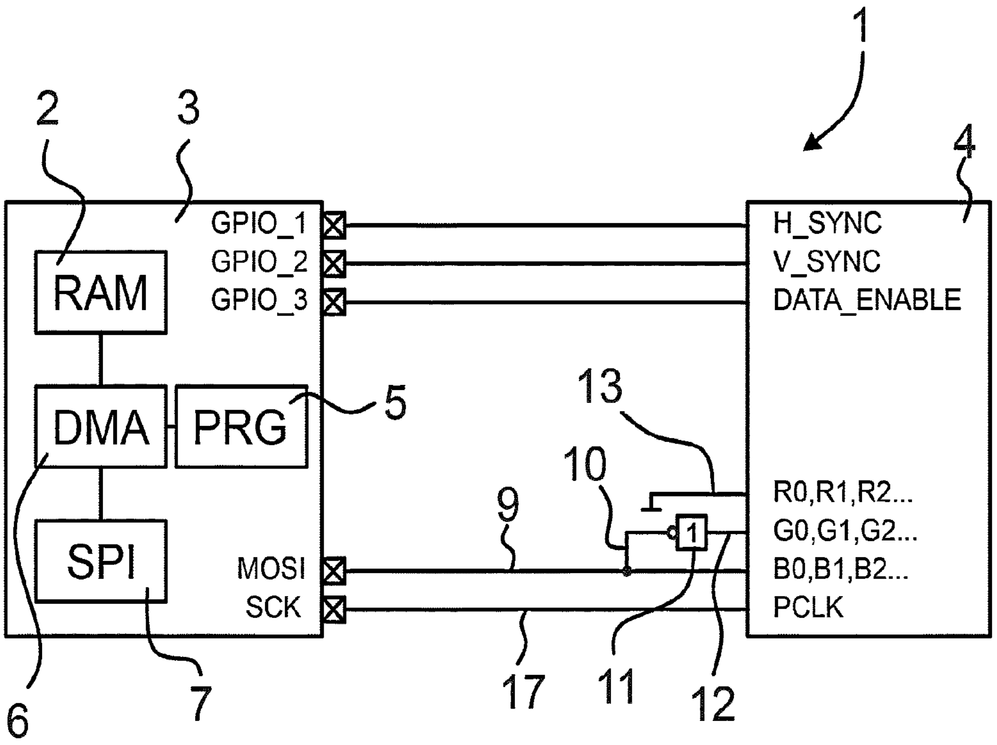
FIG. 3 is a schematic representation of an exemplary second embodiment of a controller or a display assembly for carrying out the exemplary method according to the disclosure, wherein a representative RGB input of the active matrix display for the color green is connected to the data output of the microcontroller via an inverter, and a representative RGB input of the active matrix display for the color red is set to level "0,"

In the display assembly, the SPI data output MOSI of the microcontroller 3 can also be connected via a line 10 to an inverter 11 (complement gate) if necessary, wherein the output of the inverter 11 is then connected via a line 12 to one or more RGB inputs of the active matrix display 4. In FIG. 3, for example the inverter 11 is connected via one or more lines 12 only to color inputs for green (G0, G1, G2, . . . , etc.). The color inputs for red (R0, R1, R2, . . . , etc.) are always set to "0" by means of the line 13.

Figure 4:
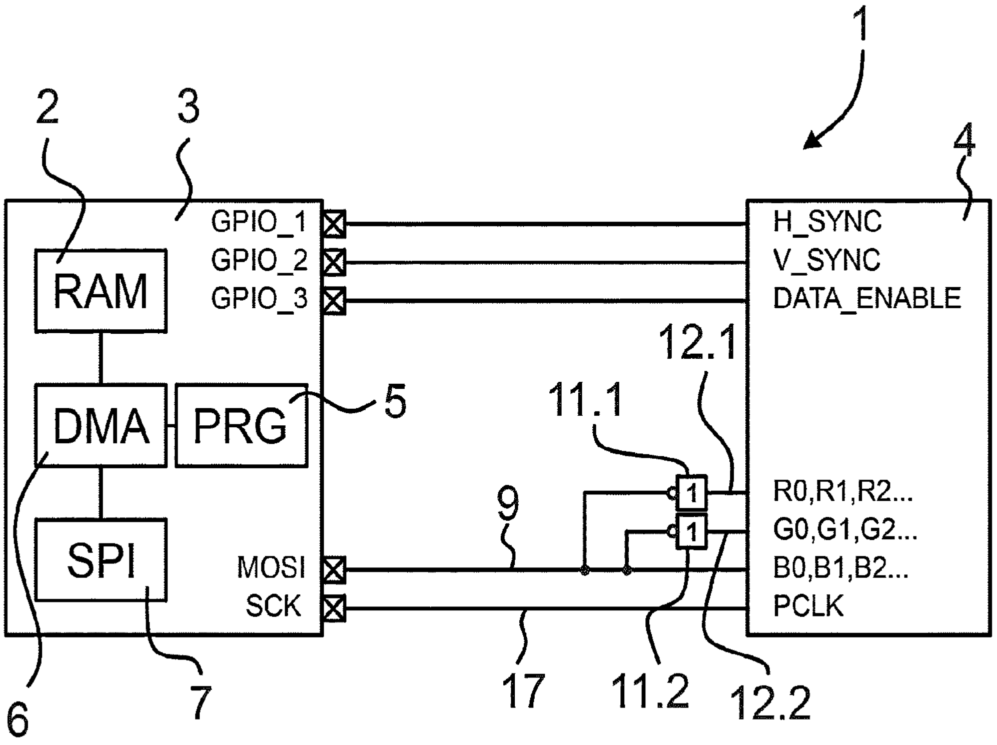
FIG. 4 is a schematic representation of an exemplary third embodiment of a controller or a display assembly for carrying out the exemplary method according to the disclosure, wherein a representative RGB input of the active matrix display for the colors green and red is connected in each case to the data output of the microcontroller via an inverter.

In FIG. 4, on the other hand, for example two inverters 11.1 and 11.2 are provided, wherein the first inverter 11.1 is connected via a first or multiple first lines 12.1 to color inputs for red (R0, R1, R2, . . . , etc.), and the second inverter 11.2 is connected via a second or multiple second lines 12.2 to color inputs for green (G0, G1, G2, . . . , etc.).

Figure 5:
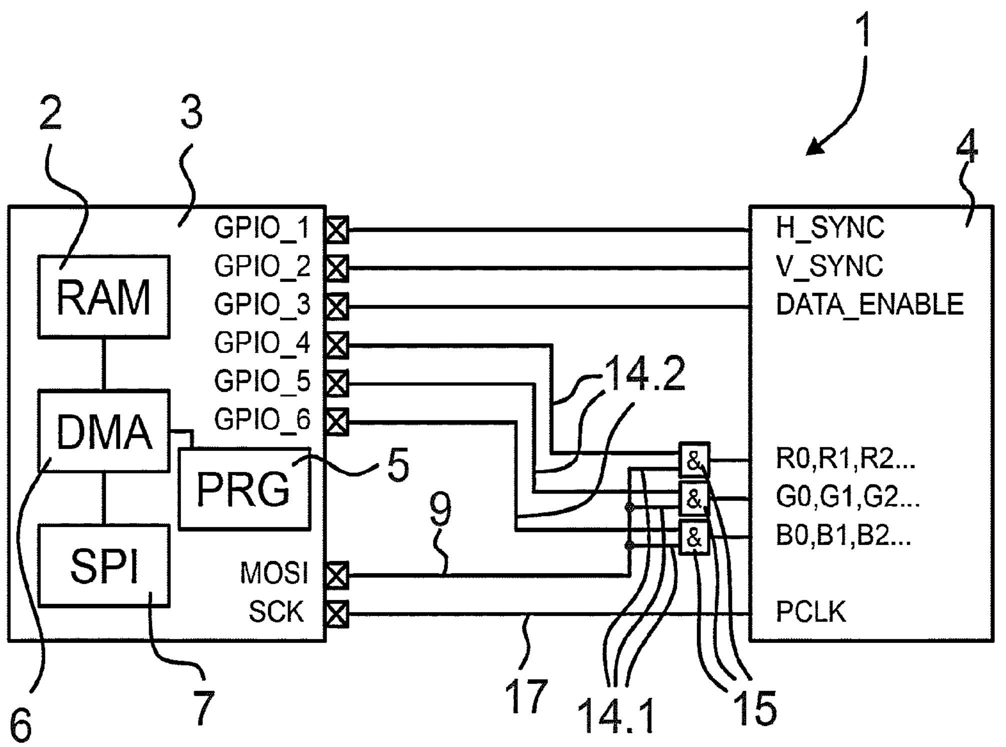
FIG. 5 is a schematic representation of an exemplary fourth embodiment of a controller or a display assembly for carrying out the exemplary method according to the disclosure, wherein a representative RGB input of the active matrix display for the colors blue, green, and red is connected in each case to the data output of the microcontroller via an AND gate, and the AND gates are actuated via separate GPIO's.

FIG. 5 shows, in a modified embodiment, how, in the display assembly, the data output MOSI of the microcontroller 3 can be connected if appropriate to a corresponding first input 14.1 of one or more AND gates 15, so that the program, via for example three additional GPIO's (GPIO_4, GPIO_5, GPIO_6) of the microcontroller 3, which are connected to the corresponding second input 14.2 of the corresponding AND gate 15, can provide control data, for masking the data stream, before the masked data stream is fed to one or more of the RGB inputs (R0, R1, R2, . . . ,etc., G0, G1, G2, . . . , etc., B0, B1, B2, . . . , etc.) of the active matrix display 4, in order to automatically set a desired RGB value by controlling the at least one AND gate 15 using the program stored in the program storage device 5.

Figure 6:
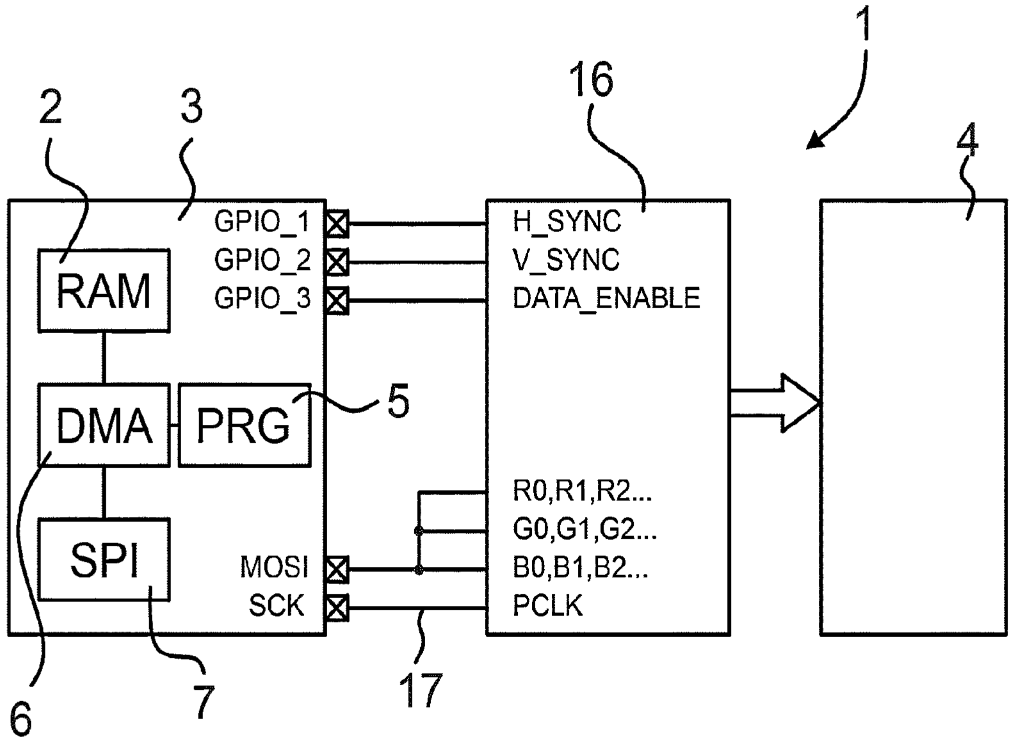
FIG. 6 is a schematic representation of an exemplary fifth embodiment of a controller or a display assembly for carrying out the exemplary method according to the disclosure, wherein the microcontroller is connected to inputs of an interface converter, and the outputs of the interface converter are connected to the active matrix display.

In the display assembly, the microcontroller 3 can be connected to an interface converter 16 at the input side, as shown in FIG. 6, instead of directly to the active matrix display 4, so that a data stream of the RGB image data set is converted into a modified data stream of another display interface, in particular into a modified data stream of a non-parallel RGB interface, before the converted data stream is fed to the active matrix display 4, in particular an active matrix display 4 with an interface other than a parallel RGB interface, as an image data set. In this respect, in such a modified display assembly, the interface converter 16 is connected at the output side to the active matrix display 4.

Figure 7:
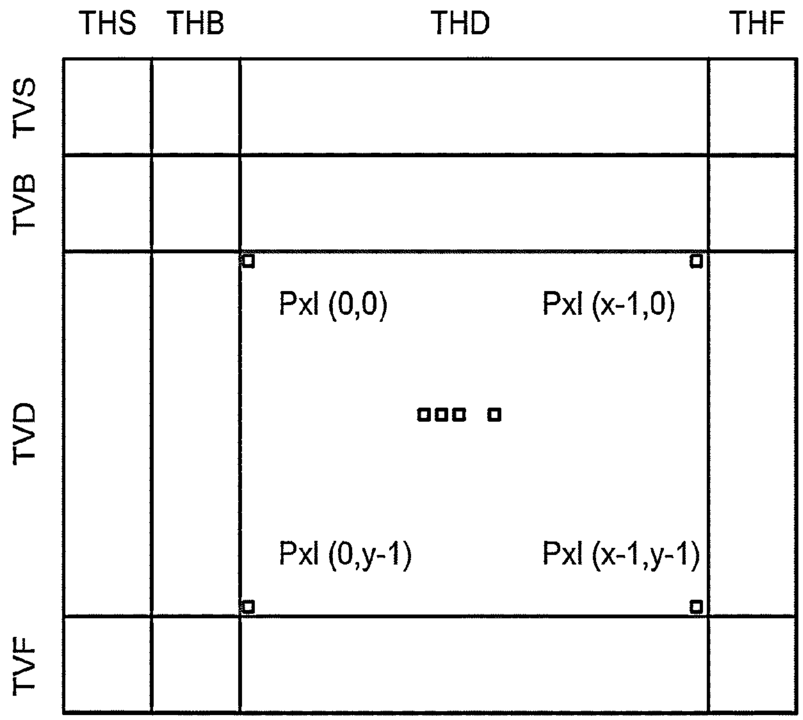
FIG. 7 is a schematic representation of the structure of the image data and the blanking data that correspond to the specification of a parallel RGB interface.
Figure 8:
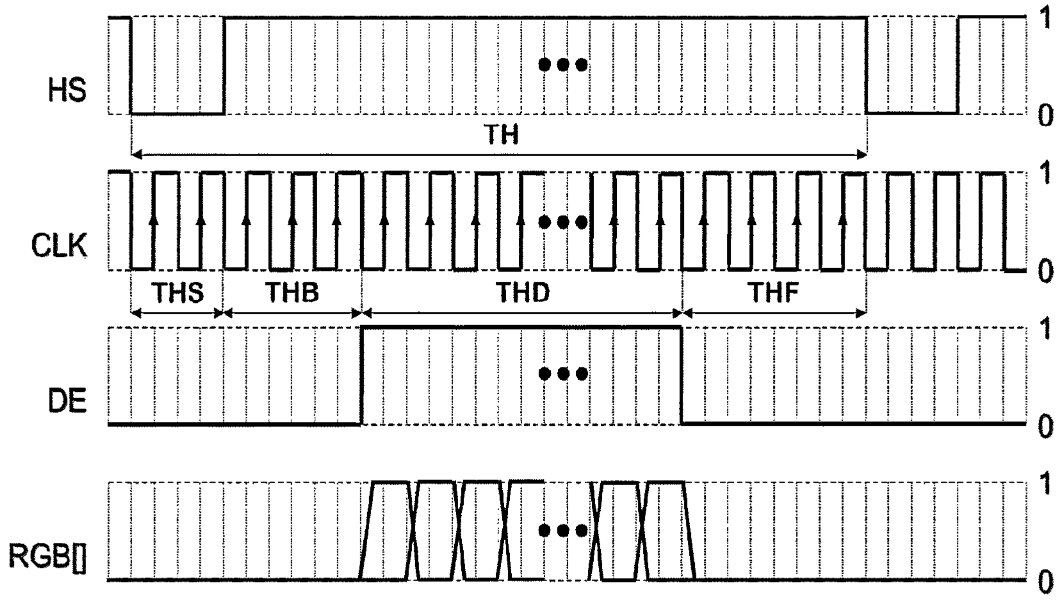
FIG. 8 is a schematic representation of the horizontal timings of a parallel RGB interface.
Figure 9:
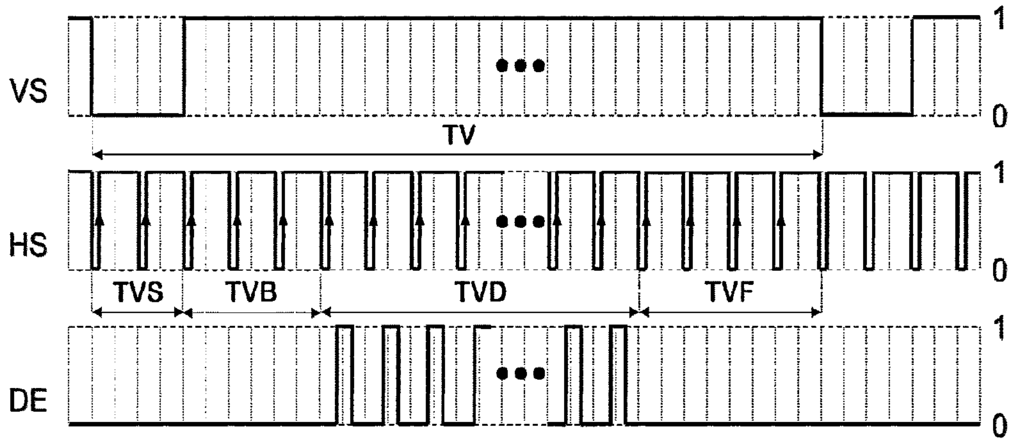
FIG. 9 is a schematic representation of the vertical timings of a parallel RGB interface.

FIG. 7 schematically shows the structure of the image data (pixels Pxl(0,0) to Pxl(x-1,y-1)) and the blanking data, which correspond to the specification of a parallel RGB interface. The method uses the peripheral modules of the hardware SPI peripheral 7 and the DMA controller 6 contained in the microcontroller 3 to emulate a parallel RGB interface for controlling the active matrix display 4. The microcontroller 3 needs to have only enough RAM or ROM memory (internal or external) to store a display image or a partial region thereof with a color depth of 1 bit per pixel. This data storage device 2 is also referred to below as a frame buffer. In this way, an active matrix display 4 with a resolution of, for example, 320×240 pixels only requires a frame buffer of 9.6 kByte. The DMA controller 6 is used here to transfer the frame buffer directly to the module of the hardware SPI peripheral 7. This transfer is controlled by an interrupt configured by a software algorithm or microcontroller program so that the hardware SPI peripheral 7 transmits, in addition to the user data, the required blanking data (also referred to as porches), which a parallel RGB interface must provide for the synchronization of the active matrix display 4. The blanking data are here transmitted both before and after each visible row (horizontal front and back porch), and before and after each visible column (vertical front and back porch). The visible image is thus surrounded by an invisible frame according to the specification of the parallel RGB interface. During this time, the color value "black" is transmitted. The data-enable signal (DE for short) of a parallel RGB interface indicates whether one is currently in the visible or invisible part of the transmission. In addition, the interface requires a horizontal synchronization pulse before each line (HSYNC line, HS for short) and a vertical synchronization pulse (VSYNC line, VS for short) before each image, as illustrated in FIG. 8 and FIG. 9. This results in four horizontal and four vertical regions, the duration of which, i.e., the number of transmitted pixels, depends in each case upon the active matrix display 4 to be controlled.

Figure 10:
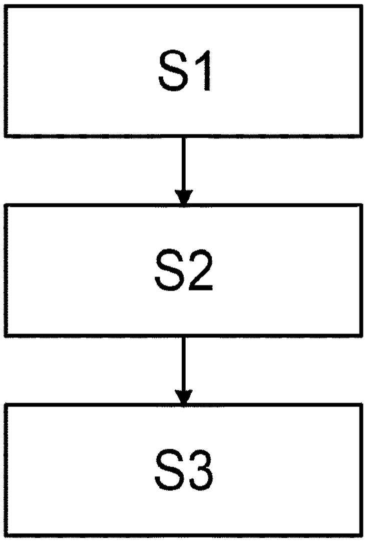
FIG. 10 shows a flowchart of the steps in the basic method according to the disclosure.

In FIG. 10, the method for controlling active matrix displays 4 is shown as a flowchart.

In a first step S1, a data storage device 2 is loaded with image data in a color depth of 1 bit per pixel of an image to be displayed on an active matrix display 4.

In a second step S2, execution takes place of a program which is stored in a program storage device 5 of a microcontroller 3 and which controls a DMA controller 6 in such a way that the DMA controller 6 reads out the image data of the color depth of 1 bit per pixel from the data storage device 2, wherein the read-out image data of the color depth of 1 bit per pixel are extended by the program by additional blanking data which correspond to the specification of a parallel RGB interface, so that an RGB image data set (frame) which can be read in by the active matrix display 4 is generated.

In a third step S3, transmission takes place of the RGB image data set generated by the program by means of the DMA controller 6 to a hardware SPI 7 connected to the DMA controller 6, which SPI transmits the RGB image data set serially to the active matrix display 4 via its data output MOSI, wherein the SPI clock output SCK controls the pixel clock input PCLK of the active matrix display 4 to synchronize the data transmission to the active matrix display 4.

The first step S1 of the method, the second step S2 of the method, and the third step S3 of the method do not necessarily have to be carried out sequentially separated from one another. Rather, steps S1, S2, and/or S3, or partial steps of each, can be carried out simultaneously, with a time delay, and/or in a different sequence; in particular, the blanking data can specifically be inserted in on-the-fly fashion—for example, when the horizontal synchronization, the horizontal back porch, and the horizontal front porch are added to the visible image data during the transmission of a row of an image.

Figure 11:
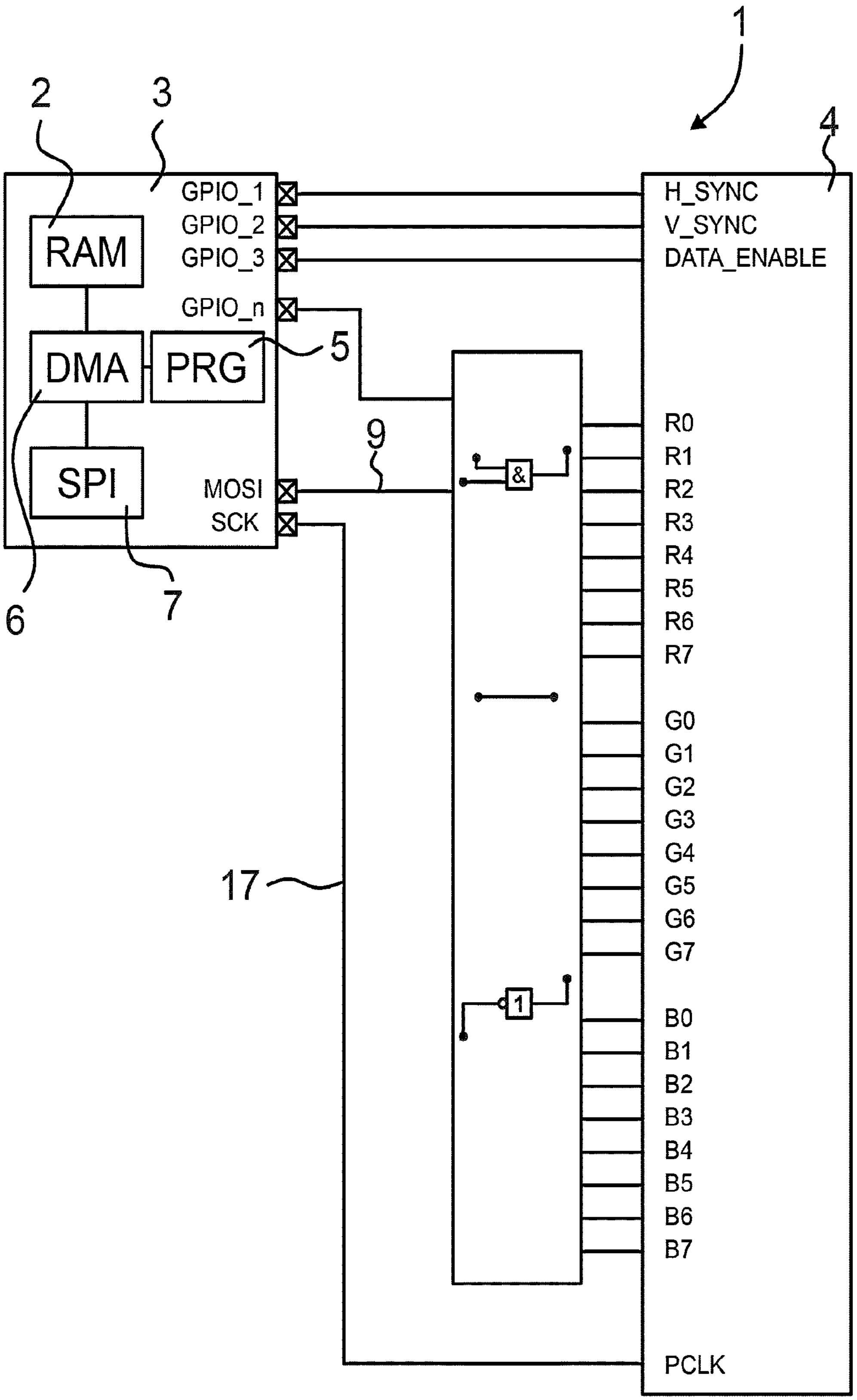
FIG. 11 is a schematic representation of 8-bit color channels of the RGB inputs of an exemplary active matrix display.

FIG. 11 shows a schematic representation of 8-bit color channels of the RGB inputs of an exemplary active matrix display 4. In FIG. 1 to FIG. 6, only a single line (R0, R1, R2 . . . , G0, G1, G2 . . . , B0, B1, B2 . . . ) is shown for each color channel (red, green, blue), to increase clarity. Of course, depending upon the color depth of the selected active matrix display 4, a certain number of multiple lines can be present per color channel (red, green, blue), each of which can be connected according to one of the disclosed embodiments, e.g., hard-wired, as shown in FIG. 1 and FIG. 2, connected via an inverter 11, as shown in FIG. 3 and FIG. 4, and/or connected via an AND gate 15, as shown in FIG. 5. FIG. 11 shows a representative example of inputs of RGB color channels with a color depth of 8 bits per pixel. This means that, for each primary color red, green, and blue, there can be 8 input lines (R0, R1, R2, R3, R4, R5, R6, R7, G0, G1, G2, G3, G4, G5, G6, G7, B0, B1, B2, B3, B4, B5, B6, B7). Each of the 8 input lines in each case can be selectively connected either in the same way or in different ways.

Figure 12:
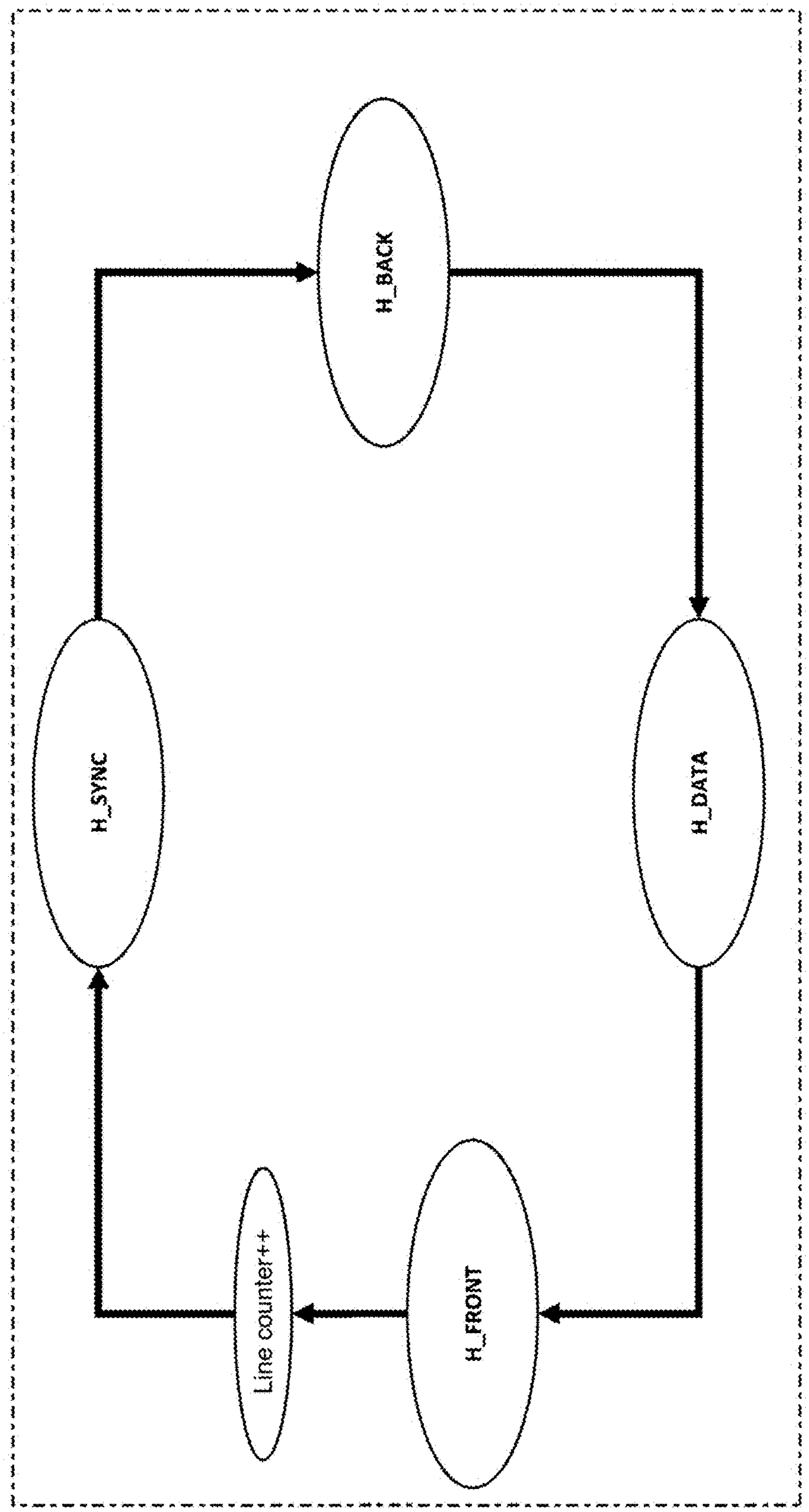
FIG. 12 is a schematic representation of a state machine H_STATE for generating the horizontal synchronization signals and transmitting the image data.

FIG. 12 shows an exemplary state machine H_STATE for generating the horizontal synchronization signals and transmitting the image data.

The following tasks are carried out in the state machine H_STATE for generating the horizontal synchronization signals and transmitting the image data:

If the required number of transmitted pixels (THS, THB, THD, or THF) is reached, depending upon the current state (H_SYNC, H_BACK, H_DATA, or H_FRONT), the system switches to the next state. The counting of the transferred pixels is done by the DMA controller 6. Each H_STATE state change is preceded by one or more completed DMA transfer processes. The state machine H_STATE is controlled by the progress of the DMA controller 6. The horizontal timings of the emulated parallel RGB interface are specified by the parameters THS, THB, THD, and THF. These values must be adapted to the display to be used. If the state machine H_STATE is in the state H_DATA, and V_STATE is in the state V_DATA, the DMA controller 6 transfers visible image data from the frame buffer to the hardware SPI peripheral 7. In any other case, blanking data are transmitted, depending upon H_STATE and V_STATE. For this purpose, the DMA controller 6 sends the required amount of dummy data (0×00) to the hardware SPI peripheral 7. Each time the state H_FRONT was left, a row was completely transmitted. The row counter is then incremented upwards, which in turn controls the state machine V_STATE.

Figure 13:
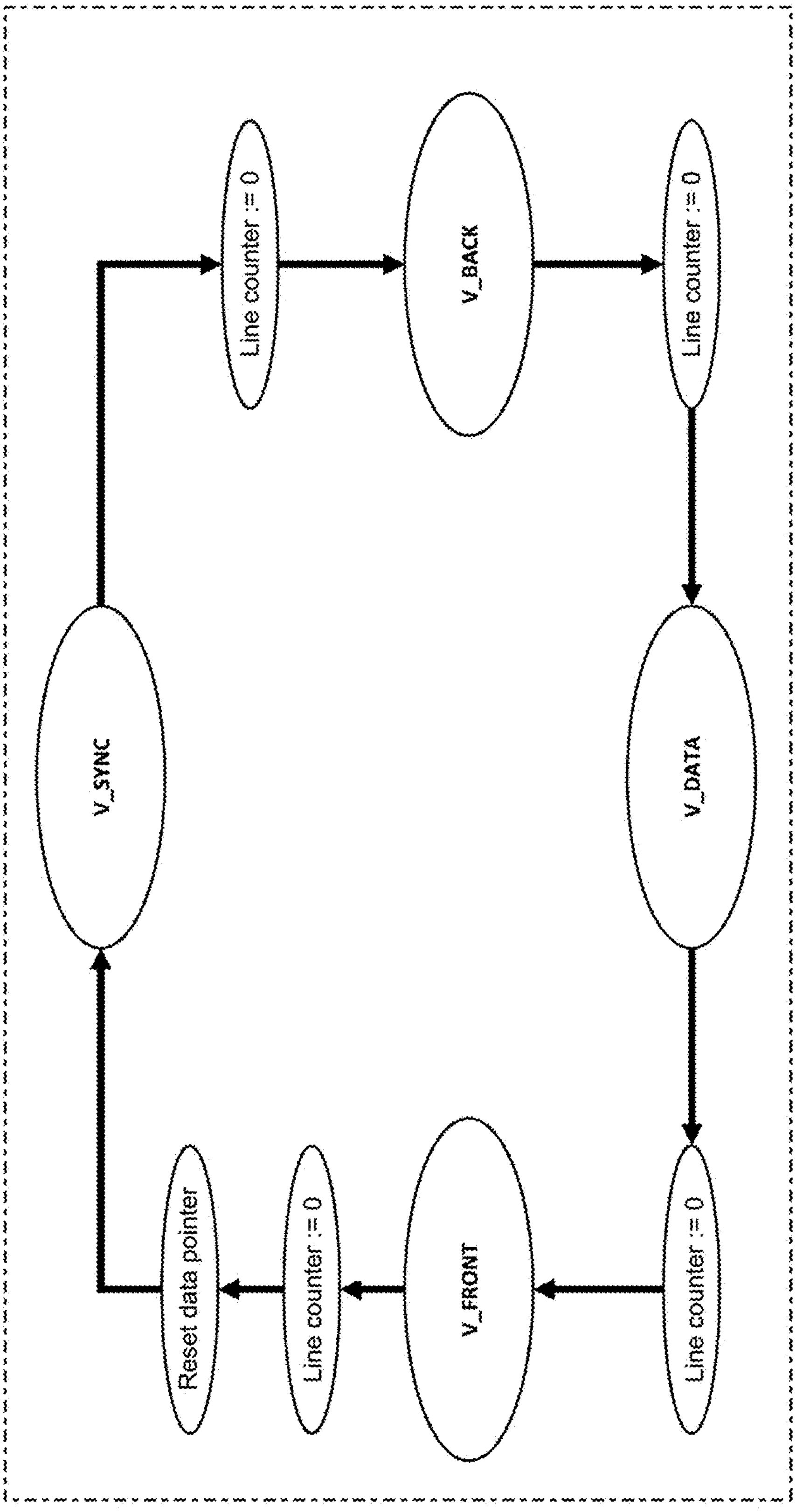
FIG. 13 is a schematic representation of a state machine V_STATE for generating the vertical synchronization signals.

FIG. 13 shows an exemplary state machine V_STATE for generating the vertical synchronization signals.

The following tasks are performed in the state machine V_STATE for generating the vertical synchronization signals:

If, depending upon the current state (V_SYNC, V_BACK, V_DATA, or V_FRONT), the corresponding number of rows (TVS, TVB, TVD, or TVF) of the row counter is reached, the system switches to the next state. Before each V_STATE state change, the row counter is reset. The state machine V_STATE is controlled by the row counter and can only reset it. The row counter is incremented upwards by the state machine H_STATE. The vertical timings of the emulated parallel RGB interface are specified by the parameters TVS, TVB, TVD, and TVF. These values must be adapted to the display to be used. Each time the V_FRONT state was left, an image was completely transmitted. The data pointer of the frame buffer can then be reset or set to a new image source.

Figure 14:
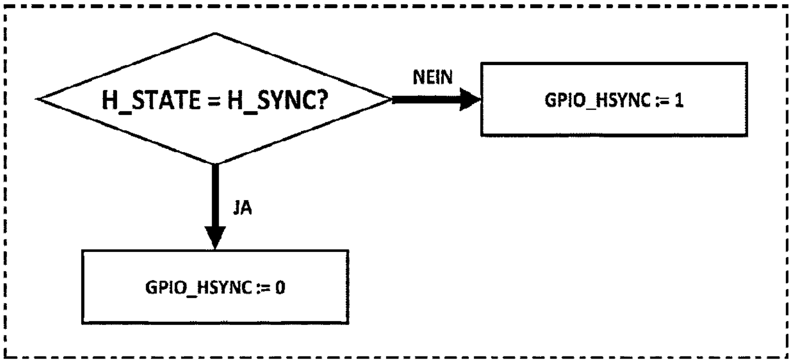
FIG. 14 is a schematic representation of a flowchart for generating the horizontal synchronization signal HSYNC.

FIG. 14 shows an exemplary flowchart H_SYNC for generating the horizontal synchronization signal H_SYNC.

The logic level of the H_SYNC signal is generally "active low".

Figure 15:
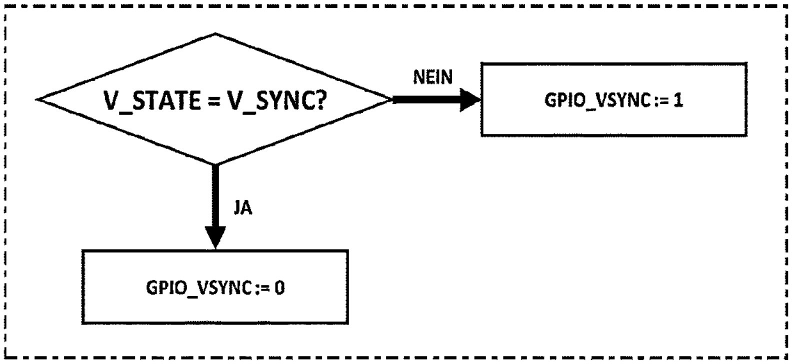
FIG. 15 is a schematic representation of a flowchart for generating the vertical synchronization signal VSYNC.

FIG. 15 shows an exemplary flowchart V_SYNC for generating the vertical synchronization signal V_SYNC.

The logic level of the V_SYNC signal is generally "active low."

Figure 16:
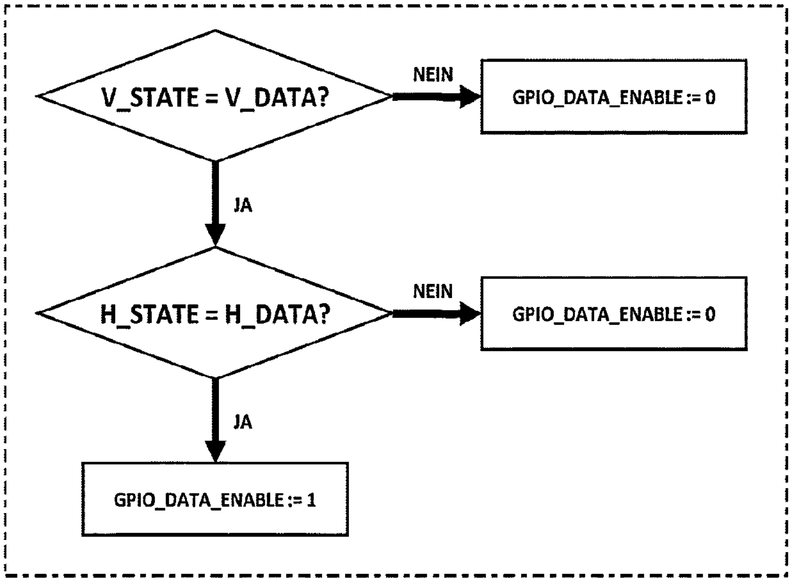
FIG. 16 is a schematic representation of a flowchart for generating the synchronization signal DATA-ENABLE.

FIG. 16 shows an exemplary DATA_ENABLE flowchart for generating the synchronization signal DATA_ENABLE.

The logic level of the DATA_ENABLE signal is generally "active high."

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling active matrix displays, the method comprising:

loading a data storage device with image data of an image to be displayed on an active matrix display, the image data in a color depth of one bit per pixel;

executing a program stored in a program storage device of a microcontroller and which controls a direct memory access (DMA) controller such that the DMA controller reads the image data from the data storage device, and the program extends the read image data by adding additional blanking data which correspond to the specification of a parallel RGB interface such that an RGB image data set (frame) which can be read in by the active matrix display is generated;

transmitting the RGB image data set generated by the program using the DMA controller to a hardware serial peripheral interface (SPI) connected to the DMA controller, wherein the SPI transmits the RGB image data set serially to the active matrix display via a data output of the SPI, and wherein a clock output of the SPI actuates a pixel clock input of the active matrix display to synchronize the data transmission to the active matrix display;

feeding a serial data stream of the image data transmitted via the data output to a corresponding first input of one or more AND gates;

providing with the program, control data for masking the data stream before the masked data stream is fed to one or more RGB inputs of the active matrix display via at least one general purpose input/output (GPIO) of the microcontroller, which GPIO is connected to a corresponding second input of the respective AND gate in each case;

actuating the at least one AND gate with the program to automatically set a desired RGB value; and displaying an image on the display based on the transmitted image data.

2. The method of claim 1, wherein the program automatically adds the additional blanking data to the image data according to a predetermined specification when the program is executed to emulate a parallel RGB interface.

3. The method of claim 2, wherein the program automatically adds the additional blanking data by inserting the blanking data in portions into a serial data stream of the image data in accordance with a row-by-row and column-by-column grid.

4. The method of claim 3, wherein inserting the blanking data in portions into the serial data stream comprises inserting a number of dummy bytes corresponding to the specification of the parallel RGB interface into the data stream of the image data.

5. The method of claim 1, further comprising:

automatically synchronously generating with the program synchronization signals required for a synchronized reading of a serial data stream of the image data into the active matrix display; and sending the synchronization signals by the program to the active matrix display via general purpose inputs/outputs (GPIOs) of the microcontroller.

6. The method of claim 1, wherein one or more RGB inputs of the active matrix display are connected to one another, and are jointly connected to the data output of the hardware SPI.

7. The method of claim 1, further comprising:

passing a serial data stream of the image data transmitted via the data output through an inverter before feeding the data to one or more RGB inputs of the active matrix display.

8. The method of claim 1, wherein the program stored in the program storage device, when executed, automatically switches the at least one AND gate in a time-synchronized manner with the data stream.

9. The method of claim 8, wherein at least one of:

the at least one AND gate is switched on the basis of the signal at the SPI clock output; or the at least one AND gate is switched to change the color to be displayed on the active matrix display column by column, row by row, or pixel by pixel.

10. A controller, comprising:

a data storage device configured for storing image data in a color depth of one bit per pixel of an image to be displayed on an active matrix display; and a microcontroller having a program storage device in which a program is stored, the program designed and configured to carry out the method of claim 1.

11. The controller of claim 10, wherein:

the microcontroller controls a DMA controller instructed by the program, and a hardware SPI connected to the DMA controller in such a way that an RGB image data set generated by the program can be transmitted by the DMA controller to the hardware SPI such that the hardware SPI sends the RGB image data set serially to the active matrix display via a data output of the hardware SPI; and a clock output of the hardware SPI is connected to a pixel clock input of the active matrix display in order to synchronize the data transmission to the active matrix display.

12. A method for controlling active matrix displays, the method comprising:

loading a data storage device with image data of an image to be displayed on an active matrix display, the image data in a color depth of one bit per pixel;

executing a program stored in a program storage device of a microcontroller and which controls a direct memory access (DMA) controller such that the DMA controller reads the image data from the data storage device, and the program extends the read image data by adding additional blanking data which correspond to the specification of a parallel RGB interface such that an RGB image data set (frame) which can be read in by the active matrix display is generated;

transmitting the RGB image data set generated by the program using the DMA controller to a hardware serial peripheral interface (SPI) connected to the DMA controller, wherein the SPI transmits the RGB image data set serially to the active matrix display via a data output of the SPI, and wherein a clock output of the SPI actuates a pixel clock input of the active matrix display to synchronize the data transmission to the active matrix display;

sending the RGB image data set to an interface converter before transmitting the RGB image data set to the active matrix display;

converting the data stream of the RGB image data set with the interface converter into a modified data stream of another display interface; and feeding the converted data stream to the active matrix display as an image data set; and displaying an image on the display based on the transmitted image data.

13. The method of claim 12, wherein at least one of:

the interface converter converts the data stream into a modified data stream of a non-parallel RGB interface; or the converted data stream is fed to an active matrix display with an interface other than a parallel RGB interface.

14. A computer program product having program code stored on a non-transient, computer-readable storage medium, the program code, when executed on a controller, causing the controller to:

load a data storage device with image data of an image to be displayed on an active matrix display, the image data in a color depth of one bit per pixel;

control a direct memory access (DMA) controller such that the DMA controller reads the image data from the data storage device;

extend the read image data via the program by adding additional blanking data which correspond to the specification of a parallel RGB interface such that an RGB image data set (frame) which can be read in by the active matrix display is generated;

transmit the RGB image data set generated by the program using the DMA controller to a hardware serial peripheral interface (SPI) connected to the DMA controller, wherein the SPI transmits the RGB image data set serially to the active matrix display via a data output of the SPI, and wherein a clock output of the SPI actuates a pixel clock input of the active matrix display to synchronize the data transmission to the active matrix display;

feed a serial data stream of the image data transmitted via the data output to a corresponding first input of one or more AND gates;

provide with the program, control data for masking the data stream before the masked data stream is fed to one or more RGB inputs of the active matrix display via at least one general purpose input/output (GPIO) of the microcontroller, which GPIO is connected to a corresponding second input of the respective AND gate in each case; and actuate the at least one AND gate with the program to automatically set a desired RGB value.

* * * * *